US008930830B2

(12) United States Patent
Solaja et al.

(10) Patent No.: US 8,930,830 B2
(45) Date of Patent: Jan. 6, 2015

(54) CONTEXT-AWARE COMPOSITES OF FUNCTIONAL MODULES

(75) Inventors: Ivan Solaja, Dublin (IE); Qiang Han, Ashtown (IE)

(73) Assignee: Business Objects Software Limited, Dublin (IE)

( * ) Notice: Subject to any disclaimer, the term of this patent is extended or adjusted under 35 U.S.C. 154(b) by 952 days.

(21) Appl. No.: 12/752,486

(22) Filed: Apr. 1, 2010

(65) Prior Publication Data

US 2011/0246914 A1 Oct. 6, 2011

(51) Int. Cl.
*G06F 3/00* (2006.01)
*G06F 9/54* (2006.01)
*G06F 3/048* (2013.01)

(52) U.S. Cl.
CPC ................ *G06F 9/542* (2013.01); *G06F 3/048* (2013.01); *G06F 2209/545* (2013.01)
USPC ........... 715/761; 715/765; 715/851; 715/853; 715/835

(58) Field of Classification Search
CPC .... G06F 9/542; G06F 3/048; G06F 2209/546
USPC .......................... 715/761, 765, 851, 853, 835
See application file for complete search history.

(56) References Cited

U.S. PATENT DOCUMENTS 6,418,448 B1 7/2002 Sarkar
7,752,556 B2 * 7/2010 Forstall et al. ................ 715/761
2004/0268228 A1 12/2004 Croney et al.
2008/0195454 A1 8/2008 Lee
2008/0201326 A1 8/2008 Cotter et al.
2008/0222572 A1 9/2008 Nathan et al.
2008/0222599 A1 9/2008 Nathan et al.
2008/0281741 A1 11/2008 Hyde
2009/0070409 A1 * 3/2009 Clayton et al. ................ 709/203
2009/0217194 A1 8/2009 Martin et al.
2009/0249359 A1 * 10/2009 Caunter et al. ................ 719/315
2009/0249446 A1 10/2009 Jenkins et al.
2009/0276753 A1 11/2009 Bouillet et al.
2009/0313601 A1 12/2009 Baird et al.
2009/0320105 A1 12/2009 Jurkiewicz et al.
2009/0328025 A1 12/2009 Johnson et al.
2010/0023875 A1 1/2010 Choudhary et al.
2010/0100605 A1 * 4/2010 Allen et al. ................... 709/217
2010/0153865 A1 6/2010 Barnes et al.

(Continued)

OTHER PUBLICATIONS

"HousingMaps"—HomePage, retrieved May 10, 2010, retrieved from Internet http://www.housingmaps.com, 2pgs.

(Continued)

*Primary Examiner* — Michael Roswell
(74) *Attorney, Agent, or Firm* — Buckley, Maschoff & Talwalkar LLC

(57) ABSTRACT

A computer-implemented system to receive user input at a first functional module, to issue an instruction from the first functional module to change a value of a first context item in response to the user input, to receive the instruction at a context services provider, and to issue, via the context data services provider, a notification of the changed value of the first context item. The notification is received at a second functional module based on an association of the second functional module with the first context item, and first functionality of the second functional module is generated based on the notification of the changed value of the first context item.

22 Claims, 12 Drawing Sheets

(56) References Cited

U.S. PATENT DOCUMENTS

| | | | |
|---|---|---|---|
| 2010/0192140 | A1 | 7/2010 | Kamiyama et al. |
| 2010/0199169 | A1 | 8/2010 | Gnech et al. |
| 2010/0211580 | A1 | 8/2010 | Sreekanth |
| 2011/0078600 | A1 | 3/2011 | Guertler et al. |
| 2011/0093514 | A1 | 4/2011 | Brown et al. |
| 2011/0107273 | A1 | 5/2011 | Ranganathan et al. |
| 2011/0138354 | A1 | 6/2011 | Hertenstein et al. |
| 2011/0202821 | A1 | 8/2011 | Roy et al. |
| 2011/0231592 | A1 | 9/2011 | Bleier et al. |
| 2011/0314007 | A1 | 12/2011 | Dassa et al. |
| 2012/0030592 | A1 | 2/2012 | Cui et al. |

OTHER PUBLICATIONS

Holt Adams "Mashup business scenarios and patterns: Part 1", Jun. 29, 2009 (Published Feb. 3, 2009), retrieved May 10, 2010, Internet URL: http://www.ibm.com/developerworks/lotus/library/mashups-patterns-pt1/, 10pgs.

Holt Adams "Mashup business scenarios and patterns: Part 2", Jun. 29, 2009 (Published Jan. 27, 2009), retrieved May 10, 2010, Internet URL: http://www.ibm.com/developerworks/lotus/library/mashups-patterns-pt2/, 10pgs.

IBM United States Software Announcement 209-360, "Work smarter with IBM Mashup Center V2.0", dated Oct. 27, 2009, 18pgs.

Jesse Feiler "How to Do Everything with Web 2.0 Mashups", Copyright 2008, The McGraw-Hill Companies, ISBN: 978-0-07-149627-8, MHID: 0-07-149627-0, (cover 5pgs. + About the Authors and Technical Editor 1pg. + Contents at a Glance 1pg. + Contents, Acknowledgements, and Introduction Vii-XV (9pgs.) + pp. 3-290 + Index pp. 291-303 + back cover 1pg., total 319 pages).

Weiyi Cui et al., "Non-Final Office Action", mailed May 2, 2012, for U.S. Appl. No. 12/847,360, entitled "Mashup Component Authoring Tool for Business Enterprise User Interfaces", filed Jul. 30, 2010, 19pgs.

Weiyi Cui et al., "Non-Final Office Action", mailed Dec. 5, 2012, for U.S. Appl. No. 12/847,360, entitled "Mashup Component Authoring Tool for Business Enterprise User Interfaces", filed Jul. 30, 2010, 17pgs.

Weiyi Cui et al., "Non-Final Office Action", mailed May 1, 2012, for U.S. Appl. No. 12/845,270, entitled "Mashup Component Framework for Business Enterprise User Interfaces", filed Jul. 28, 2010, 18pgs.

Weiyi Cui et al., "Non-Final Office Action", mailed Aug. 23, 2012, for U.S. Appl. No. 12/845,270, entitled "Mashup Component Framework for Business Enterprise User Interfaces", filed Jul. 28, 2010, 15pgs.

Gina Trapani, Lifehacker "Geek to live: Create your master feed with Yahoo Pipes", Feb. 14, 2007, Internet: URL:http//web.archive.org/web/20090221034155/http://lifehacker.com/235726/[Mar. 28, 2012 11:14:43 AM], 7pgs.

Weiyi Cui et al., "Advisory Action", mailed Sep. 12, 2013, for U.S. Appl. Serial No. 12/847,360, entitled "Mashup Component Authoring Tool for Business Enterprise User Interfaces", filed Jul. 30, 2010, 3pgs.

Weiyi Cui et al., "Final Office Action", mailed Jul. 3, 2013, for U.S. Appl. No. 12/847,360, entitled "Mashup Component Authoring Tool for Business Enterprise User Interfaces", filed Jul. 30, 2010, 26pgs.

Weiyi Cui et al., "Final Office Action", mailed Aug. 12, 2013, for U.S. Appl. No. 12/845,270, entitled "Mashup Component Framework for Business Enterprise User Interfaces", filed Jul. 28, 2010, 16pgs.

* cited by examiner

Create New Composite 700

Name: SALES REPORT
Context Services Provider: SalEMEA1 ▼

Context Items:
☑ Region  EMEA ▼
☑ Year  2008 ▼
☑ Product  Triden GTI ▼
☐ Customer
☐ Channel 710
Create

900

SALES REPORT

Region: EMEA ▼
Year: 2008 ▼
Product: Triden GTI ▼

CONTEXT-AWARE COMPOSITES OF FUNCTIONAL MODULES

BACKGROUND

A mashup is generally defined as a web page or application that combines information from two or more external sources to create a new service. Web applications (e.g., Google Maps™, Yahoo! Search™) increasingly provide Application Programming Interfaces (APIs) that enable software developers to create mashups based on the data and functions of these applications.

Mashups may be used to combine functions provided by different sources. For example, a mashup may include a particular visualization of particular data provided by a first application, and a particular visualization of particular data provided by a second application. This mashup simply reflects an aggregation of the two visualizations. Advantages to such an aggregation are minimal, and no new or unanticipated functionality is provided thereby.

Some conventional mashups attempt to overcome the foregoing by providing some interaction between their constituent functions. FIG. 1 is a representative block diagram of mashup 110 including widgets 120 through 126. Each of widgets 120 through 126 includes processor-executable program code to provide data and/or functionality. For example, widgets 120 through 126 may comprise a weather icon, a photo viewer, a clock and a music player, respectively.

A developer of mashup 110 has written code (i.e., "wiring") to provide interaction between widget 120 and 122. The wiring may determine a location corresponding to a picture displayed by widget 122, and may instruct widget 120 to indicate the current weather at that location. Development of this wiring, and any other desired wiring between widgets 120 through 126, requires expertise and resources.

The requirements for creating useful mashups are magnified in an enterprise environment. First, the demand for application development resources in an enterprise environment is usually far greater than the supply. Additionally, the internal wiring of enterprise mashups must be consistently maintained in view of changes to the source applications.

What is needed is a system for efficiently creating and enabling the operation of a composite of function-providing modules which provides some degree of interaction among the modules.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
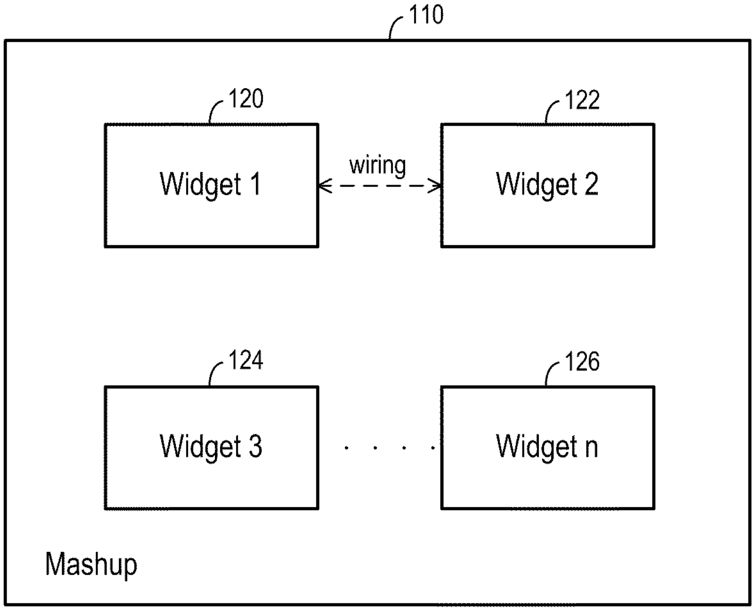
FIG. 1 is a block diagram of a prior art mashup.
Figure 2:
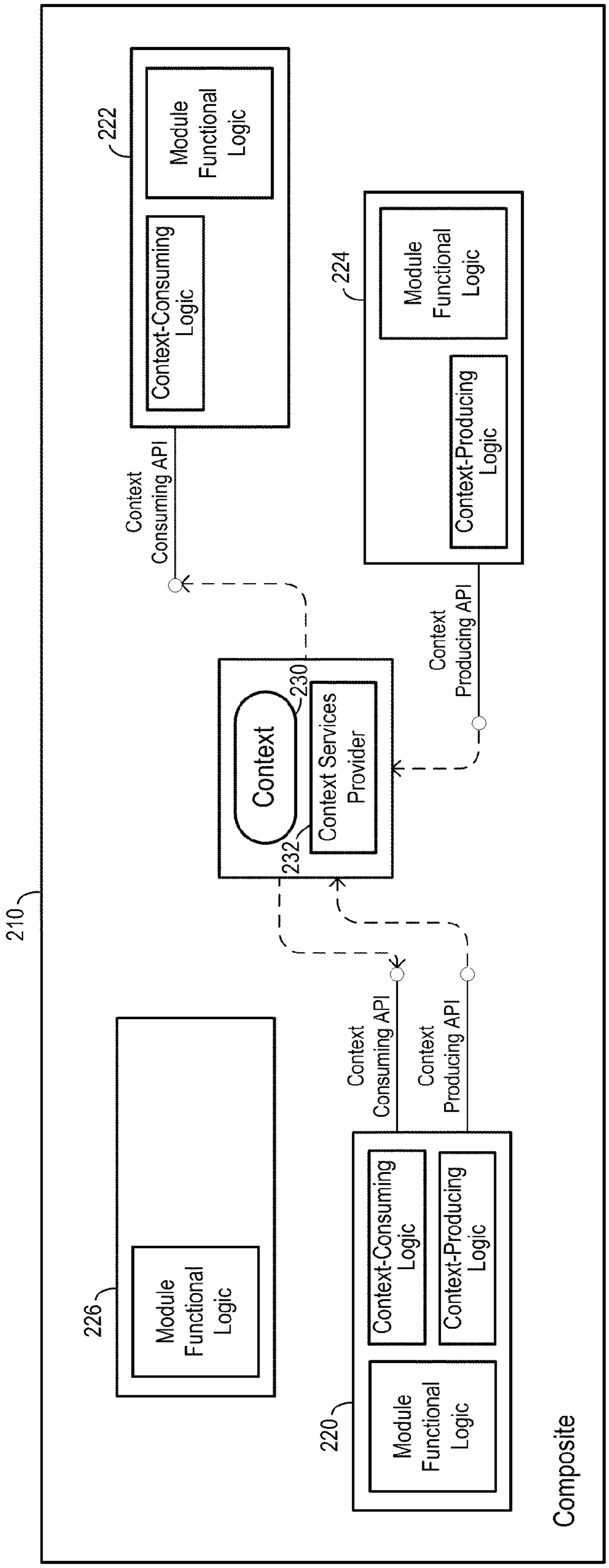
FIG. 2 is a functional block diagram according to some embodiments.

FIG. 2 is a functional block diagram of composite 210 according to some embodiments. Embodiments are not limited to composite 210 and/or to the description thereof. Composite 210 includes functional modules 220 through 226. Each of modules 220 through 226 may comprise processor-executable program code (i.e., module functional logic) to provide any functionality that is or becomes known. Such functionality may include, but is not limited to, data reception, data processing, data storage (e.g., temporary, persistent) and/or data display. Moreover, each of modules 220 through 226 may provide functionality of any currently- or hereafter-known mashup widget.

The program code of modules 220 through 226 may comprise Java, Advanced Business Application Programming (ABAP), Flash, and/or any other type of code that is or becomes known. Each of modules 220 through 226 may be associated with a respective one or more data sources. For example, module 220 may provide visualizations of data stored in a Human Resource Management system, while module 224 may provide visualizations of data stored in a Customer Relationship Management system.

Each of modules 220 through 226 includes a different combination of context-consuming logic and context-producing logic. Specifically, module 220 includes both context-consuming logic and context-producing logic, module 222 includes context-consuming logic, module 224 includes context-producing logic, and module 226 includes neither context-consuming logic nor context-producing logic. Composite 210 may include zero or more of each type of module shown in FIG. 2.

The depicted context-consuming logic and context-producing logic may support, respectively, a context-consuming API and a context-producing API. Generally, and as will be described in more detail below, the context-consuming API may be used to notify a module of a change in the value of a context item, and the context-producing API may be used by a module to change the value of a context item. As a result, modules 220 through 224 may interact with one another via changes in context item values.

Accordingly, the context-producing logic of a module may determine whether context services provider 232 should be notified of a change to a value of a specific context item, while the context-consuming logic of a module may determine which context items are to be consumed as well as functionality to execute upon receipt of a notification of a change to a value of a consumed context item.

In a simple example, module 224 invokes the context-producing API to issue an instruction to change a value of the context item Year to 2009. Context services provider 232 receive the instruction and issues a notification of the change. The notification is received by module 222, which is associated with the context item Year. Module 222 may then execute its functionality based on the changed value of the context item. For example, module 222 may produce a visualization of data associated with the year 2009.

Module 220 may also be associated with the context item Year, may also receive the notification via the context-consuming API, and may also generate a data visualization based on the changed value of the context item. According to the present example, module 226 does not include logic supporting the context-consuming API and is therefore unaffected by the change to the value of the context item.

The module functional logic of one or more of modules 220 through 226 may provide for reception of user input. With reference to the above example, module 224 may change the value of the context item Year to 2009 in response to received user input. Moreover, module 224 may execute its own functionality based on the changed value.

Composite 210 thereby allows one or more modules to contribute to/influence the environment in which they reside, and, as a result, influence one or more other modules which share the same environment. Context 230 provides the basic mechanism through which the "environment" is encapsulated and influenced.

Context 230 is abstraction of what a user of system 210 is currently doing or intending to do with modules 220 through 226. Context 230 is a set of information that can be used to characterize entities that are considered relevant to the interaction between a user and an application, including the user and the application themselves. Context 230 includes a set of context items and their associated values (e.g., Year=2009).

Figure 3:
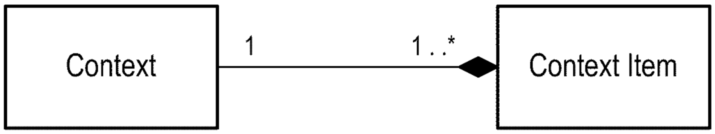
FIG. 3 is a UML class diagram according to some embodiments.

FIG. 3 is a UML class diagram to illustrate the relationship between the logical entities Context and Context Item according to some embodiments. Context Item is an atomic logic unit that describes a specific environment variable (e.g., temperature, year, data source, etc.). A collective set of context items represents a collective view of users' current working environment, e.g., Context 230. In some embodiments, a Context includes one or more Context Items.

In a sample business scenario, a user may performing a Budget Planning task in a specific application. At a point of time, a snapshot of a current Context may include the following:

```
Context <Budget Planning>
    Context Item <User: Mark>
    Context Item <Budget Period: 2009>
    Context Item <Region: UK & Ireland>
    ...
```

Provided below is an example of Context and Context Item using an eXtensible Markup Language (XML)-based format.

```
<Context name="BusinessContext">
    <ContextItem dataType="com.sap.mashup.cds.Company"
    name="Company" >
        <value>Pilot Motors</value>
    </ContextItem>
    <ContextItem dataType=" com.sap.mashup.cds.Region"
    name="Region" >
```

-continued

```
        <global name="Global">
            <region name="EMEA">
                <country name="Ireland"/>
                <country name="Italy"/>
                <country name="UK">
                    <city name="London"/>
                </country>
            </region>
            <region name="AsiaPacific">
                <country name="India"/>
                <country name="China"/>
            </region>
        </global>
    </ContextItem>
    <ContextItem dataType="com.sap.mashup.cds..FiscalYear"
    name="FiscalYear" >
        <list type="int">
            <value>2001</value>
            <value>2002</value>
            <value>2003</value>
            <value>2004</value>
        </list>
    </ContextItem>
    </Context>
```

Returning to FIG. 2, context services provider 232 collectively presents and manage context 230 through its lifecycle. Context services provider 232 allows a developer to produce and consume context items within context 230. During design time, a developer of a functional module can use context services provider 232 to declare the data structure of temperature as a context item and make the context item visible for other developers. As a result, when runtime temperature data is made available, the data can be well understood and therefore consumed by consuming modules.

According to some embodiments, context services provider 232 provides the following services:

1) A context data declaration/exposure service to allow modules to expose their data structure to context services used for data production and consumption. These context services may use a publish/subscribe protocol to provide the exposed data to modules. For example, a module may subscribe to a particular set of context items and receive published notifications from the context services indicating changes in values of those context items.

2) A context data discovery service for discovering any data exposed through these context services. Developers may use the context data discovery service to determine what data are available/visible, and implement consuming/producing behavior supported by typed/structured context data.

3) A data serialization service to allow serialization/deserialization of data using XML, for example, as a common data description language.

Although the embodiments described herein include module interaction through the use of context 230, some embodiments do not preclude the use of programmatic wiring between modules as described with respect to widgets in the above Background.

Figure 4:
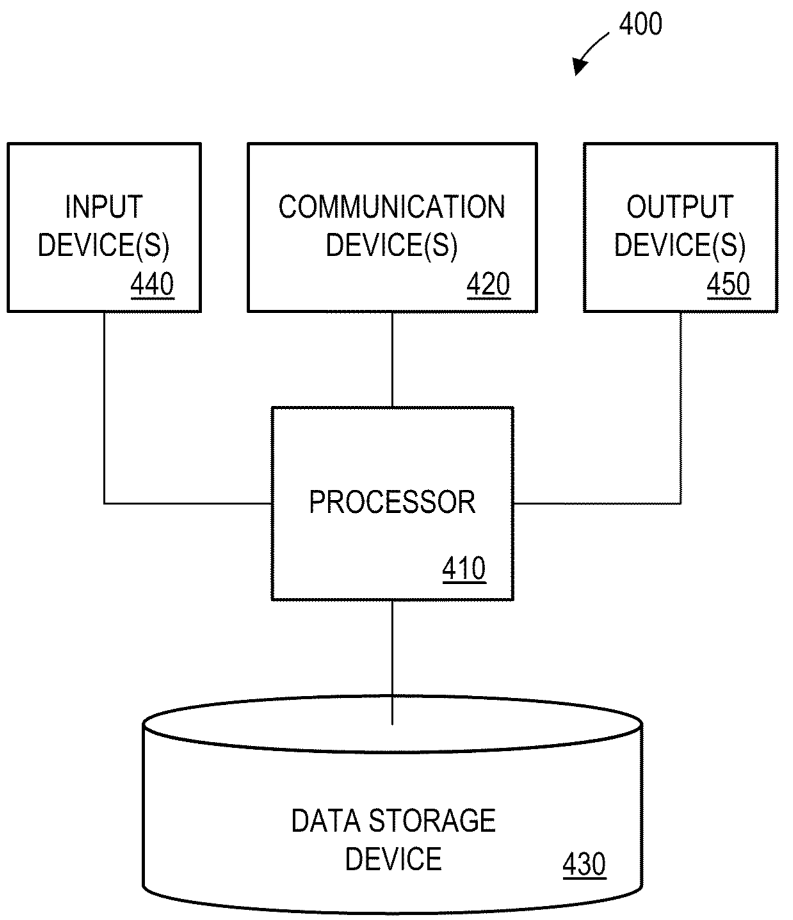
FIG. 4 is a block diagram of a hardware architecture according to some embodiments.

FIG. 4 is a block diagram of a hardware architecture according to some embodiments. System 400 may comprise a general-purpose computer system and may be operated by a developer and/or a user of composite visualizations according to some embodiments. System 400 may also comprise an application server to support modules and a context services provider as described herein. Generally, various instantiations of system 400 may be programmed to perform any combination of the functions described herein.

System 400 includes processor 410 operatively coupled to communication device 420, data storage device 430, one or more input devices 440 and one or more output devices 450. Communication device 420 may facilitate communication with external devices. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to provide user input to system 400. Output device(s) 450 may comprise, for example, a display (e.g., a display screen) a speaker, and/or a printer.

Data storage device 430 stores program code for execution by processor 410, as well as any data files for providing functions as described herein. In a case that system 400 is operated by a user as described herein, the program code may comprise program code of a Web browser to access a Web server providing functionality as described below with respect to process 500. Data storage device 430 may also or alternatively store program code of a proprietary client application for operation by a user as described herein. Data storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Figure 5:
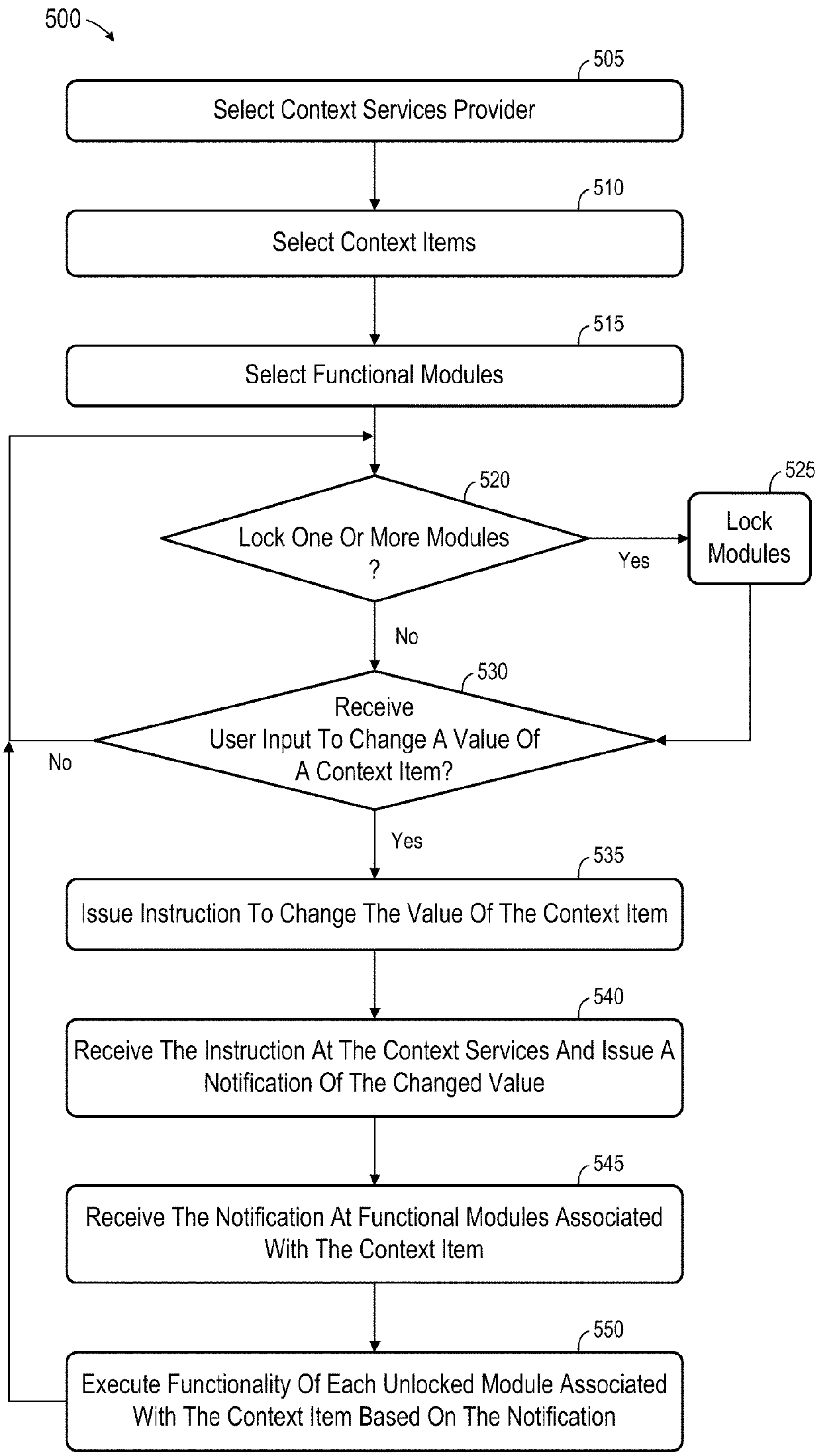
FIG. 5 is a flow diagram of a process according to some embodiments.

FIG. 5 is a flow diagram of process 500 to create and operate a system according to some embodiments. Various elements of system 200 and/or system 400 may execute process 500 according to some embodiments. Process 500 may be embodied within program code of system 400, but embodiments are not limited thereto.

Process 500 and all other processes mentioned herein may be embodied in processor-executable program code read from one or more of a tangible computer-readable medium, such as a floppy disk, a CD-ROM, a DVD-ROM, a flash memory device, and a magnetic tape, and then stored in a compressed, uncompiled and/or encrypted format. In some embodiments, hard-wired circuitry or programmable logic arrays may be used in place of, or in combination with, program code for implementation of processes according to some embodiments. Embodiments are therefore not limited to any specific combination of hardware and software.

Initially, at 505, a context services provider is selected. A developer/user may select a context services provider at 505 in order to build a composite of modules based thereon. Accordingly, the context services provider may be selected at 505 within a development environment.

In one example, a developer/user operates system 400 to initiate a development application. The development application may be stored in storage device 430 and executed by processor 410 and/or may be executed by a remote system in communication with system 400. The development application may comprise a component within another application (e.g., a business planning application which is to create, manage, and operate on the data to be visualized within the composite), or an application within a bundled suite of applications (e.g. an Enterprise Resource Planning suite, an Enterprise Performance Management suite).

Figure 6:
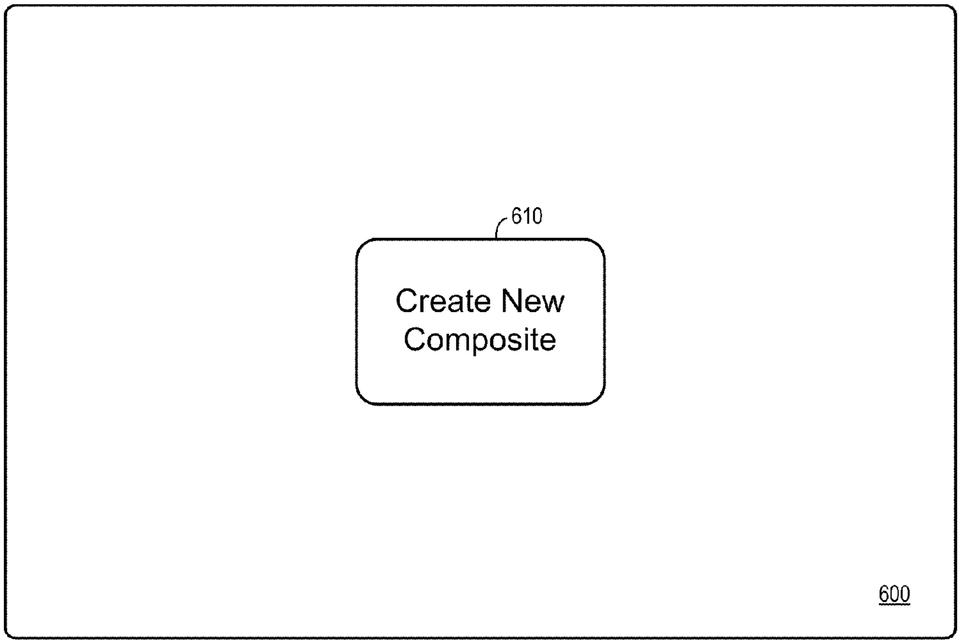
FIG. 6 is an outward view of a user interface according to some embodiments.

Continuing with this general example, output device 450 may display interface 600 of FIG. 6 prior to 505 upon execution of the development application. Interface 600 includes Create New Composite control 610. Upon user selection of control 610, interface 700 of FIG. 7 may be displayed. Interface 700 allows the user to assign a name to a new composite and, at 505, to select a context services provider upon which the new composite will be based.

Figure 7:
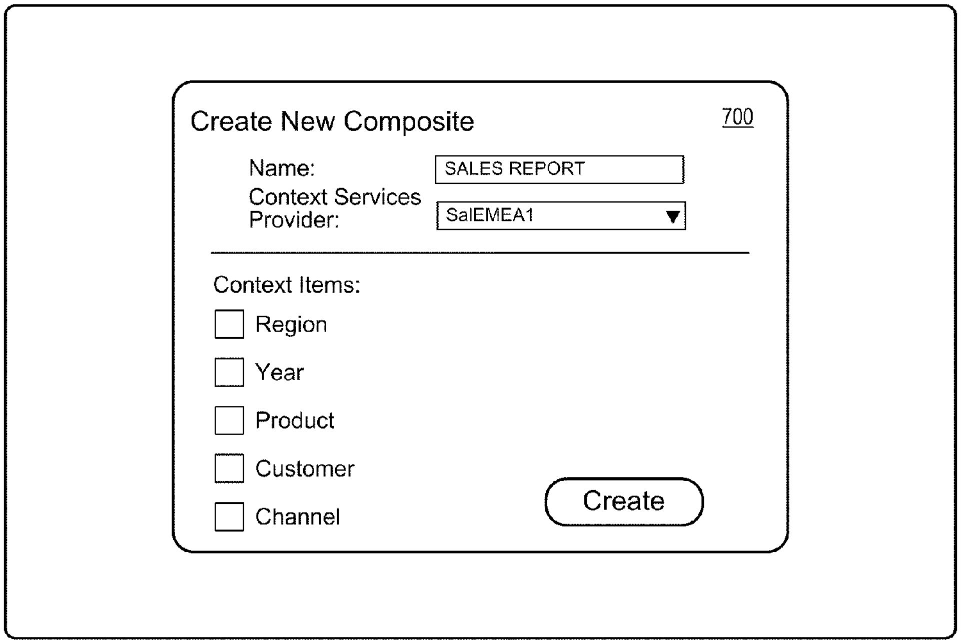
FIG. 7 is an outward view of a user interface according to some embodiments.

The context services provider may be selected from a drop-down menu of available context services. Each of the available context services providers may be associated with a set of context items. Accordingly, upon selection of a context services provider at 505, an associated set of context items may be displayed as shown in FIG. 7.

During development of a context services provider, a developer may declare the set of context items to be associated with the context services provider. The developer may, in some embodiments, determine these context items based on an underlying Online Analytical Processing (OLAP) model. For example, the dimensions of the OLAP model may include, as members, data that may be used to populate the context items. The determination of context items associated with a context services provider may therefore benefit from the typically well-defined data structure of an OLAP model. However, embodiments may support any underlying data.

Figure 8:
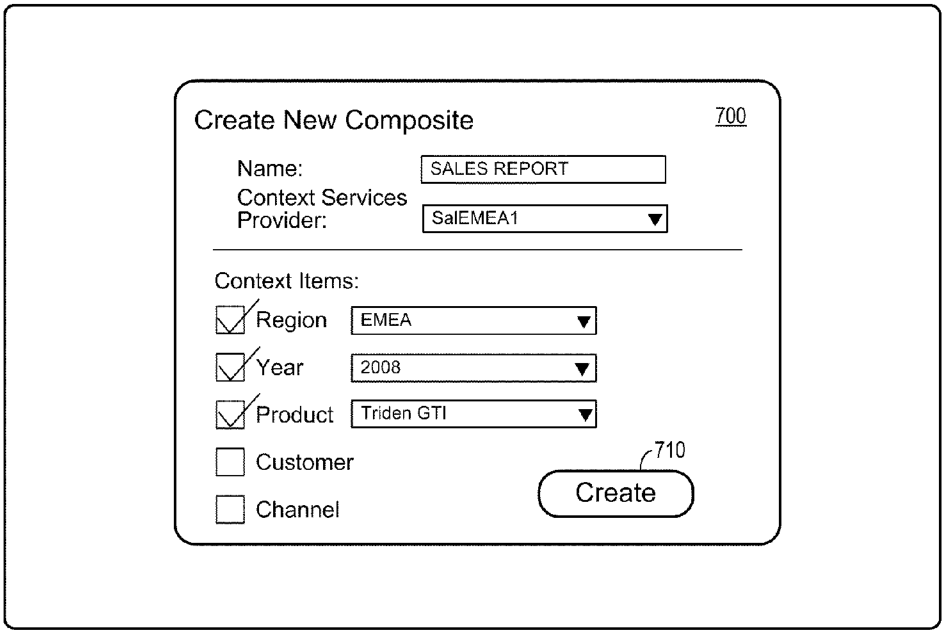
FIG. 8 is an outward view of a user interface according to some embodiments.

Context items are selected at 510. FIG. 8 illustrates the use of interface 700 to select three context items. Also depicted in FIG. 8 is the selection of default values for each of the selected context items. The composite is then initialized by selecting control 710.

Figure 9:
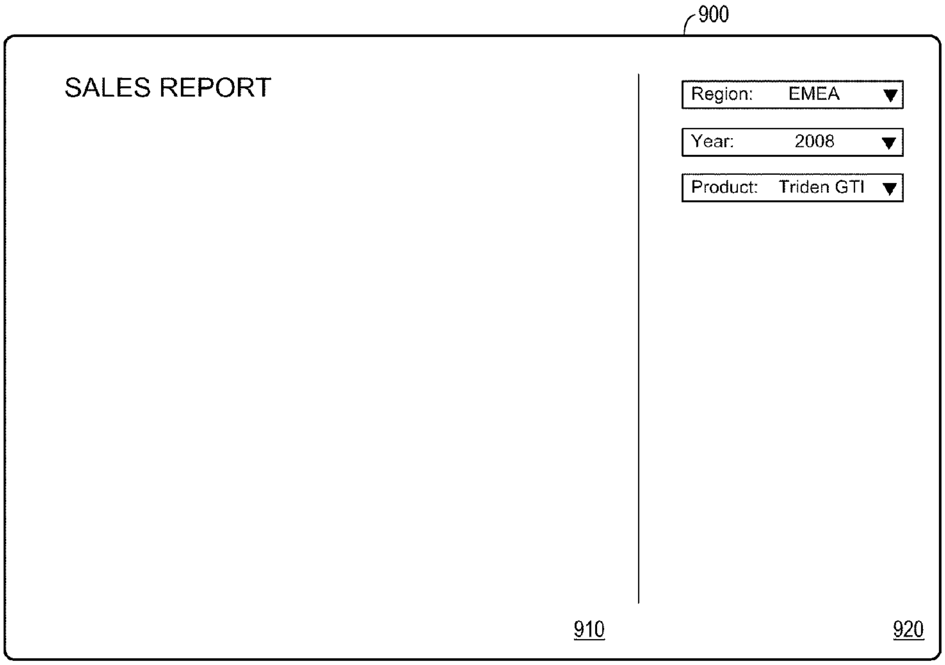
FIG. 9 is an outward view of a composite according to some embodiments.

FIG. 9 is a view of composite 900 of the present example. Composite 900 includes canvas 910 and context panel 920. For each selected context item, context panel 920 includes a drop-down field that may be used to change the current value of the context item. This change will be transmitted to context services and may subsequently affect other functional modules as described above. In this regard, context panel 920 may itself be considered a module including context-producing logic as described above.

Returning to process 500, functional modules for canvas 910 are selected at 515. The modules may be selected from a pre-existing repository of functional modules. The selected modules may exhibit any of the characteristics described above with respect to modules 220 through 226. Again, and for each selected context item, each of the selected modules may include none, one, or both of context-producing logic and context-consuming logic.

Figure 10:
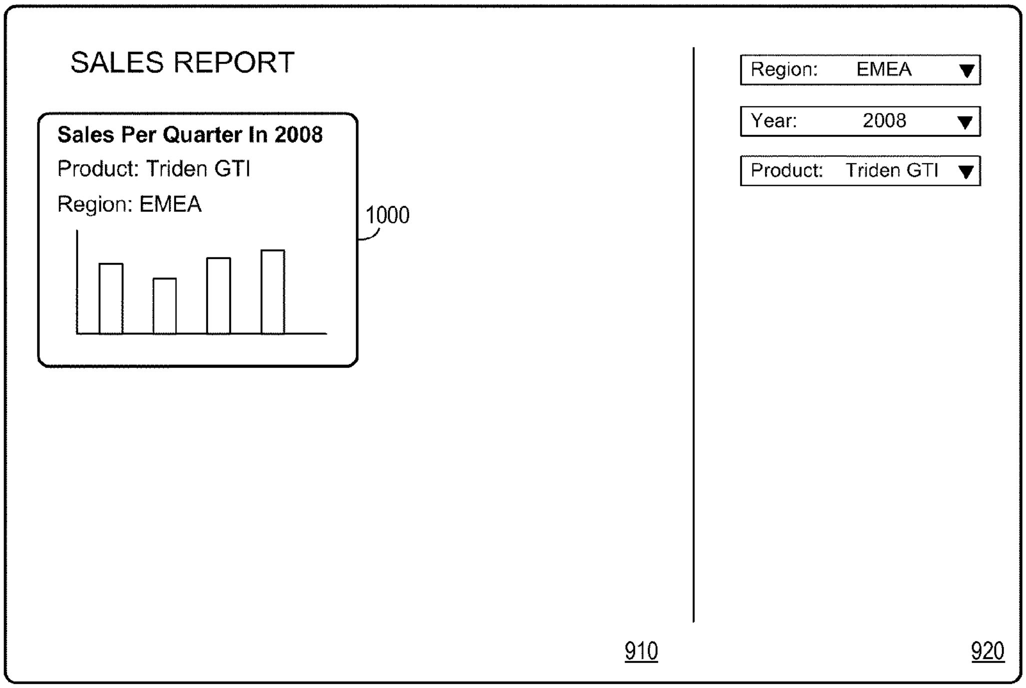
FIG. 10 is an outward view of a composite according to some embodiments.

FIG. 10 illustrates the selection of Sales per Quarter module 1000. According to the present example, module 1000 includes consuming logic to consume context items Region, Product and Year. Since values for these context items have already been defined using context panel 920, module 1000 executes its functionality (i.e., generation and display of a data visualization) based on these values. As will be described below, module 1000 will receive notifications of any changes to the values of these context items and will generate and display visualizations in response thereto.

Figure 11:
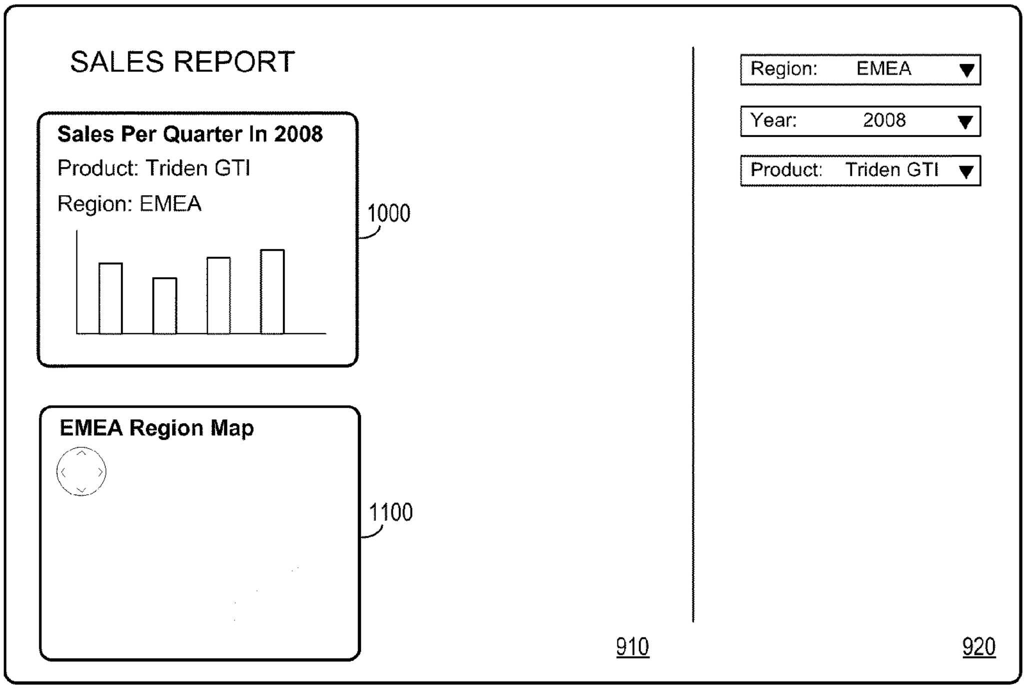
FIG. 11 is an outward view of a composite according to some embodiments.

FIG. 11 illustrates the selection of EMEA Region Map module 1100 at 515. Module 1100 includes context-producing logic to produce values of context item Region. In this regard, the remaining steps of process 500 illustrate the operation of a composite as shown in FIG. 11. These remaining steps need not occur immediately subsequent to steps 505 through 515. For example, steps 505 through 515 may be performed by a developer who then stores composite 900 in a repository. At any future time, a user may retrieve composite 900 from the repository and manipulate it to cause operation according to the remaining steps of process 500.

According to some embodiments, one or more selected modules may be "locked". A "locked" module does not re-execute its functionality regardless of any changes to values of the context items which are consumed by the module. Therefore, it may be determined at 520 whether the user has issued an instruction to lock one of more modules of the composite. If so, the one of more modules are locked at 525 and flow proceeds to 530. If not, flow proceeds directly from 520 to 530.

At 530, it is determined whether user input has been received to change a value of a context item with which the composite is associated. For example, the user may operate input device 440 of system 400 to change a value of a context item via a pull-down menu of context panel 920. In another example illustrated in FIG. 12, the user may operate a pointing input device 440 to select France within module 1100. If no such input has been received, flow returns to 520 and cycles as described above while waiting for user input to either lock a module or to change a value of a context item.

Figure 12:
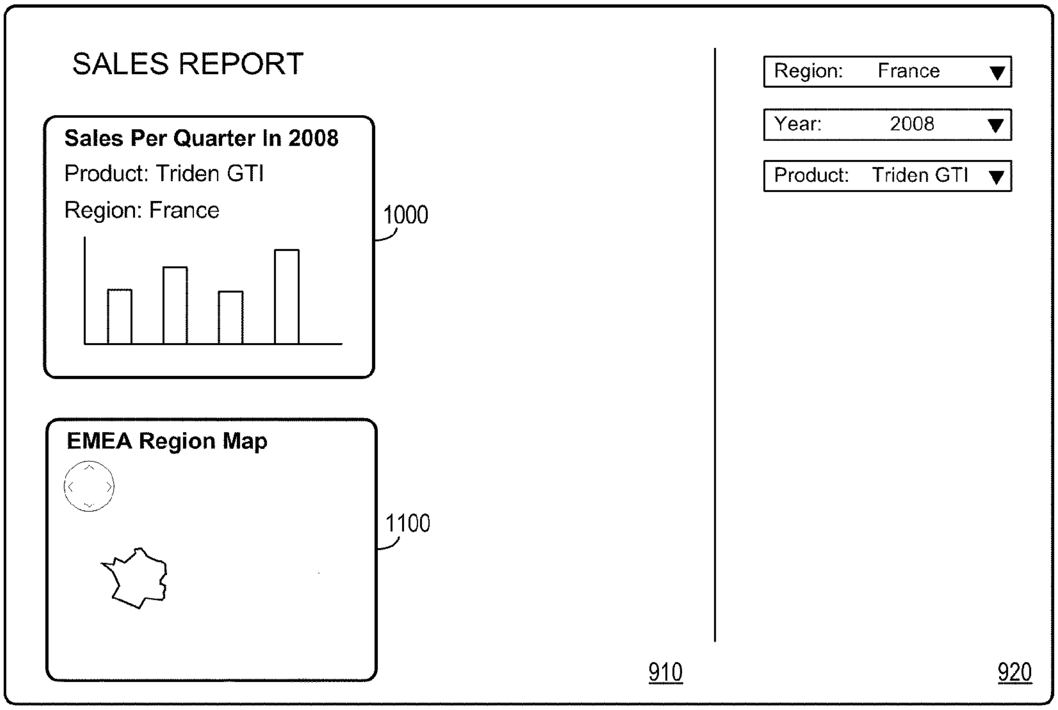
FIG. 12 is an outward view of a composite according to some embodiments.

Continuing with the FIG. 12 example, flow proceeds to 535 to issue an instruction to change the value of the context item. With reference to the embodiment of FIG. 2, module 1100 may be represented by module 224 because module 1100 includes producing logic but does not consume context items. Therefore, 535 may comprise issuing an instruction from module 224 via the context-producing API to change the value of the Region context item to "France".

Next, at 540, the instruction is received by the selected context services provider and a notification of the changed value is issued therefrom. The notification is received at 545 at zero or more modules which are associated with the context item. Steps 540 and 545 may therefore include reception of the instruction at context services provider 232 and transmission of a notification of the changed value from context services provider 232 to modules 222 and 220.

The notification might be transmitted to all modules of a composite, or may be transmitted only to those modules which have indicated an interest in the particular changed context item. Moreover, the notification might be received by all modules of a composite, or may be received only by those modules which have indicated an interest in the particular changed context item. If the notification is transmitted to and received by a module which does not use the particular changed context item, the notification may simply be ignored.

Although any communication mechanism may be employed at 540/545, some embodiments utilize a publish/subscribe protocol. For example, a consuming UI module may subscribe to a particular set of context items and receive only notifications from the context services which are related to changes in values of those context items.

The following illustrates one example of a context-consuming API implementing a publish/subscribe protocol.

```
ContextConsumer consumer = new ContextConsumer (widget);
consumer.registerInterest(INTEREST__TOPIC,
"CONTEXT__CHANGE");
consumer.registerInterest(INTEREST__DATA, "Region, FiscalYear,
Objectives, Company");
consumer.registerInterest(INTEREST__TAGS, "Budget Planning, Risk
Analysis");
consumer.registerContextProducerCallBack(contextProducer);
consumer.subscribe( );
```

In operation, when a notification of a change in a value is published, the API will be triggered based on its registered TOPIC on the context bus using INTEREST_TOPIC. The registered Interest for DATA and TAGS is logic-implemented by the consuming module to go through the Context Item property to filter consumer.doContextAction(Context ctx).

The following code snippet may be used to implement a context-producing API under a publish/subscribe protocol.

```
ContextProducer contextProducer = new
ContextProducer(sbcComponent);
contextProducer.registerDestination("CONTEXT__CHANGE");
```

-continued

```
Context context = contextProducer.produceContext( );
contextProducer.send(context);
```

The functionality of each unlocked module associated with the context item is executed at 550 based on the notification. The functionality may include one or more of data generation, data processing, data storage (e.g., temporary, persistent), data reception, data display and/or other functions. In some embodiments, execution of the functionality of at least one unlocked module associated with the context item may simply comprise determining that no action is to be performed based on the notification.

FIG. 12 illustrates a change to the data visualization of context panel 920 at 550 based on the change in the value of the Region context item. Similarly, module 1000 has generated a new visualization at 550 based on the changed value. In some embodiments, the composite includes one or more modules which are not associated with (i.e., do not subscribe to) the changed context item. These one or more modules may not receive the notification at 545, and the functionality of these modules is not executed at 550 based on the notification.

Flow returns to 520 from 550 as proceeds as described above. Values of other context items may be changed during subsequent cycles of steps 520 through 550.

Figure 13:
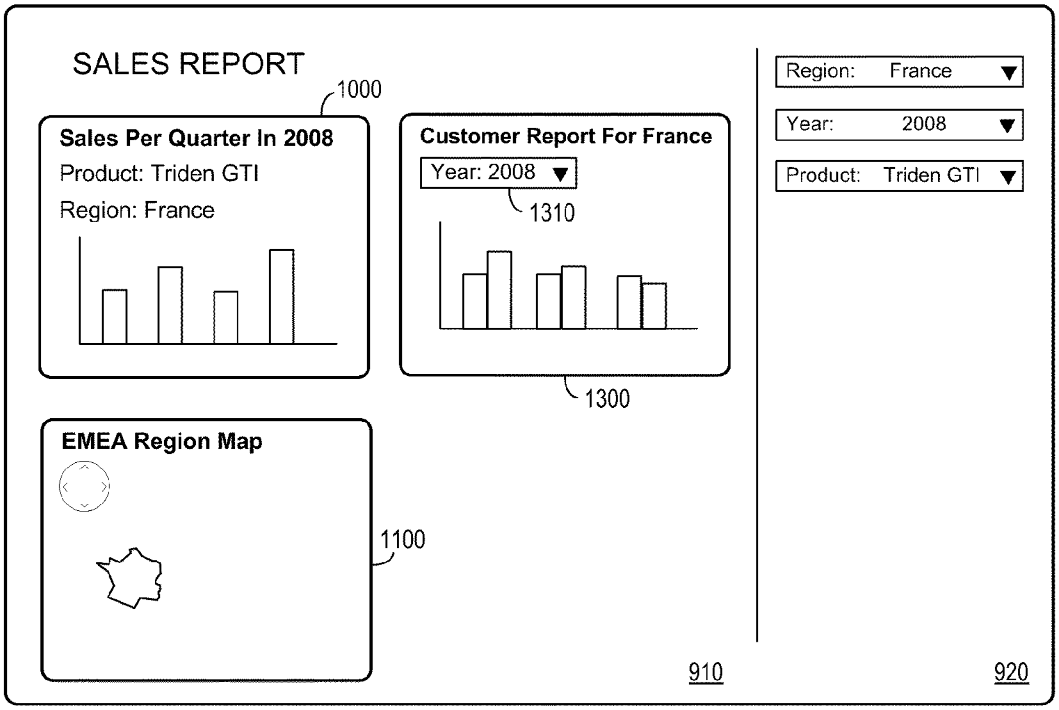
FIG. 13 is an outward view of a composite according to some embodiments.

In some embodiments, a user may add a module to an existing composite. FIG. 13 illustrates the addition of module 1300. After the addition of module 1300, process 500 may proceed through steps 520 through 550 as described above.

Module 1300 consumes context items Region, Product and Year, and also produces context item Year in response to user manipulation of menu 1310. Therefore, modules 1000, 1100 and 1300 of FIG. 13 may be represented by modules 222, 224 and 220 of FIG. 2, respectively.

Figure 14:
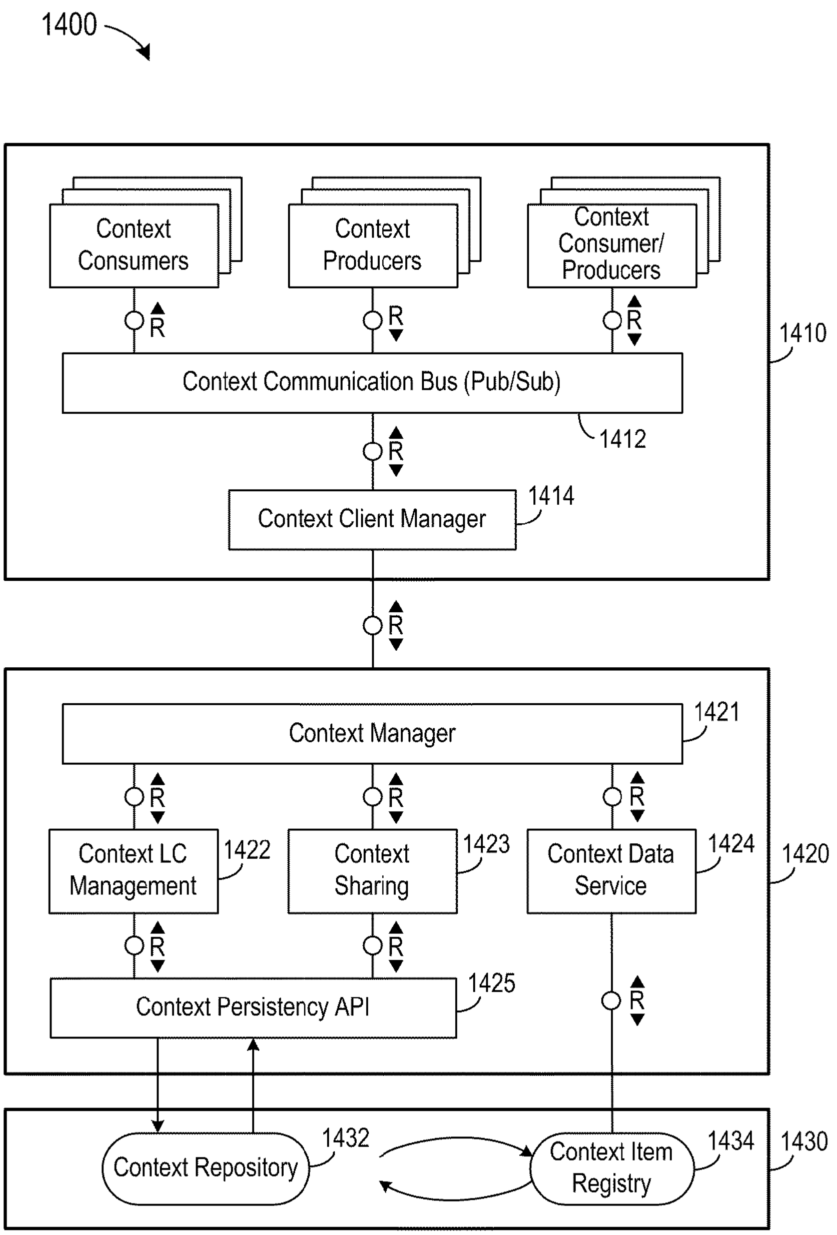
FIG. 14 is a block diagram of a system architecture according to some embodiments.

FIG. 14 is a more detailed system architecture for supporting the above-described functions according to some embodiments. System 1400 represents a client-server environment. Rich client 1410 may be implemented in program code executed by processor 410 of system 400. Context consumers of rich client 1410 may be embodied as described with respect to module 222 of FIG. 2, context producers may be embodied as described with respect to module 224, and context consumers/producers of rich client 1410 may be embodied as described with respect to module 220.

Context communication bus 1412 may support the above-described publish/subscribe protocol and may therefore provide the sole means of external communication for context consumers, context producers, and context consumers/producers of rich client 1410. Context client manager 1414 delegates context services for the context consumers, context producers, and context consumers/producers, and also coordinates context-aware communication within a composite visualization.

Application server 1420 may serve applications in addition to that described herein. Context manager 1421 provides a single entry point for client 1410 to access context services that are running on server 1420. These context services may include context lifecycle management 1422, context sharing 1423, and context data service 1424.

Context lifecycle management 1422 allows a composite visualization to create/read/update/delete (CRUD) both context and context items through a well-defined CRUD API. Context sharing 1423 provides functionality to persist a well-defined context and specify how a context can be shared among users/other visualizations. For example, a well-defined context may be saved and shared for creating a new composite visualization including UI modules reflecting the shared context. Context data service 1424 provides the functionality described above with respect to context services provider 232.

Context repository 1432 of persistency layer 1430 provides application server 1420 with storage and retrieval of context (i.e., a set of context items) via context persistency API 1425. Each context may be persisted with a unique name, which can be used for sharing and retrieval. Context data type registry 1434 allows for the registration of context items to be associated with contexts and available during creation of a composite visualization.

As described above, embodiments are not limited to any particular behavior of modules within a composite. For example, the functional logic of a module may be executed to perform any function based on any type of change (or lack of change) to the value of any context item. Similarly, the functional logic may implement any behavior for producing values of one or more context items.

Figure 15:
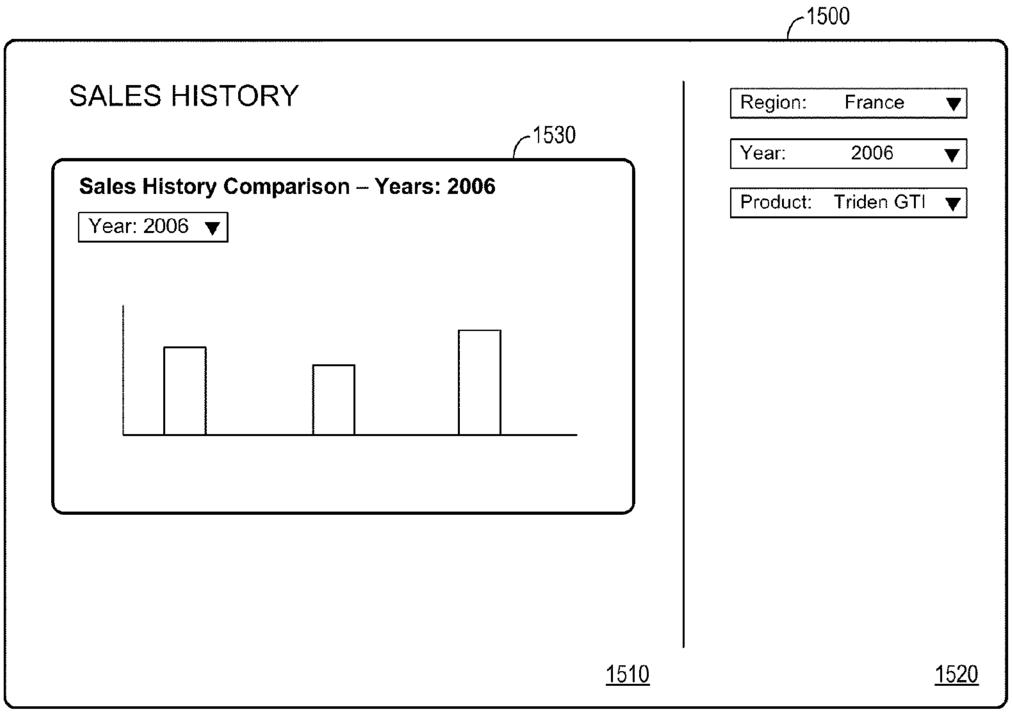
FIG. 15 is an outward view of a composite according to some embodiments.

According to one example, FIG. 15 shows composite 1500 including module 1530 within canvas 1510 and specifying three context items in context panel 1520. Module 1530, unlike the other modules described herein, does not discard a previous value of a context item with which it is associated upon receiving a notification of a new value. Rather, module 1530 uses both the previous value and the new value to generate a visualization.

Figure 16:
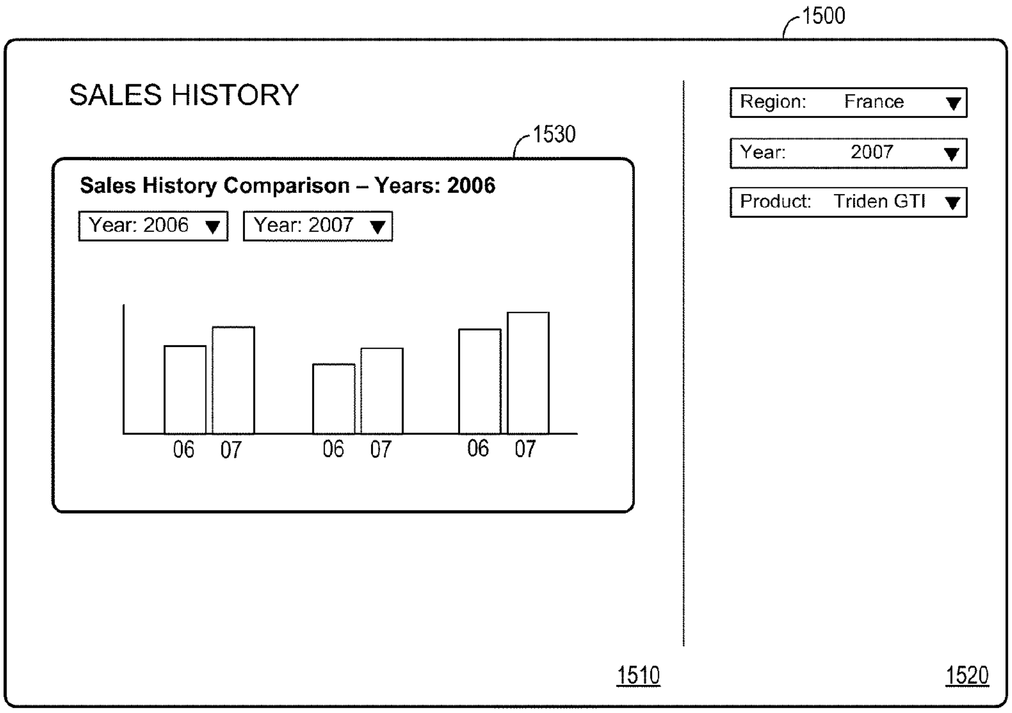
FIG. 16 is an outward view of a composite according to some embodiments.

Specifically, module 1530 consumes context item Year with an initial value of "2006" in FIG. 15. Module 1530 therefore generates a single-column chart for year 2006. The user may then manipulate context panel 1520 to change the value of Year to "2007" as shown in FIG. 16. Module 1530 receives a notification of this change and, as also shown, adds another column corresponding to the new context item value.

Figure 17:
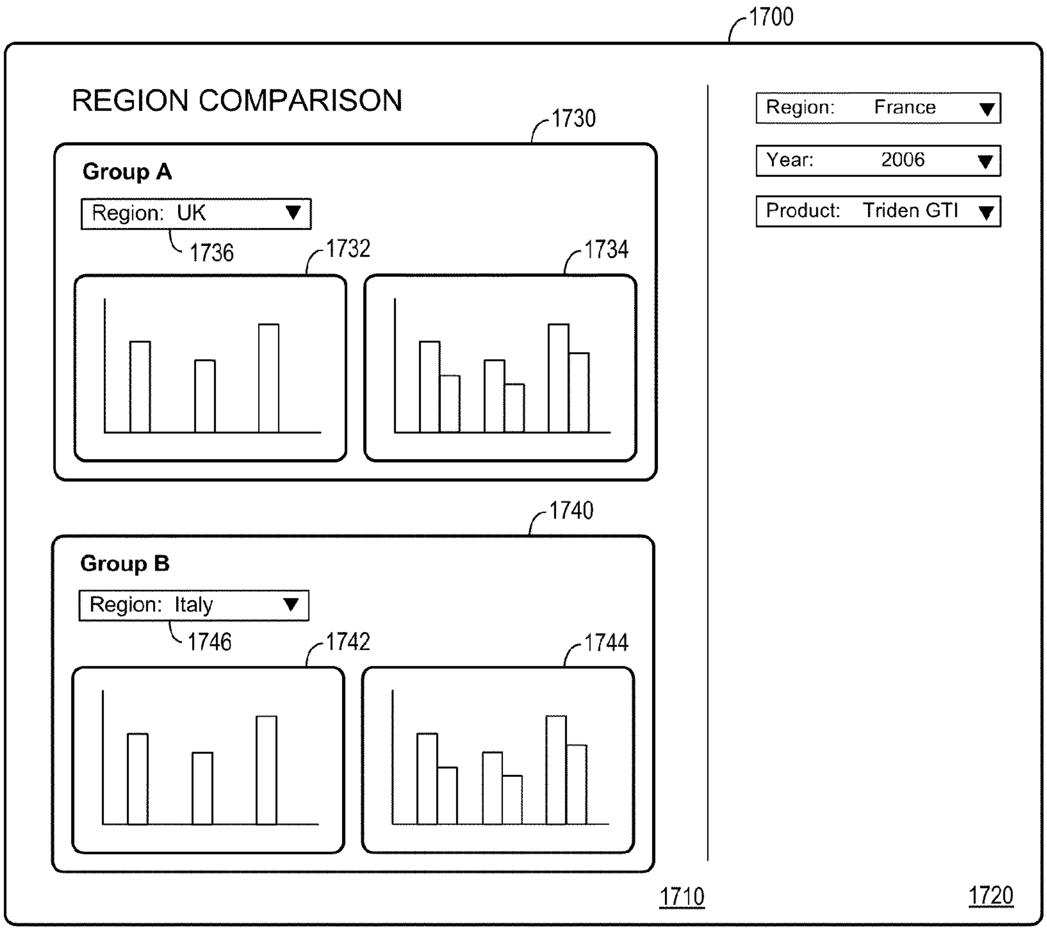
FIG. 17 is an outward view of a composite according to some embodiments.

FIG. 17 illustrates composite 1700 including hierarchically-arranged modules 1732, 1734, 1742 and 1744. Modules 1732 and 1734 are grouped in Group A 1730 and modules 1742 and 1744 are grouped in Group B 1740.

Context item Region is defined as a group context item for each of Groups 1730 and 1740. If the user changes the value of Region in context panel 1720 (i.e., at the "root" level), modules 1732, 1734, 1742 and 1744 will not be affected by that change. Modules 1732, 1734, 1742 and 1744 may therefore be considered to have context autonomy with respect to the Region context item at the root level. If the user changes the value of Region using menu 1736, then only modules 1732 and 1734 will react to that change. Moreover, if the user changes the value of Year at the root level, all modules within composite 700 will consume the new value (i.e., if they are associated with the Year context item and behave accordingly.

Groupings as shown in FIG. 17 may reduce complexity and increase comprehension of composite 1700. Visually, the user can easily identify the context boundaries for the Region context item and understand how the context item affects the different modules.

Embodiments described herein are solely for the purpose of illustration. Those in the art will recognize other embodiments may be practiced with modifications and alterations to that described above.

What is claimed is:

1. A system comprising:

a processor to execute program code to provide:

a first functional module to receive user input and to issue an instruction to change a value of a first context item in response to the user input;

a context services provider to receive the instruction and to issue a notification of the changed value of the first context item; and a second functional module associated with the first context item, the second functional module to receive the notification based on the association with the first context item, and to execute first functionality based on the notification of the changed value of the first context item;

wherein the first functional module or the second functional module is further to receive second user input and to issue a second instruction to change the value of a second context item in response to the second user input;

wherein the context services provider is further to receive the second instruction and to issue a second notification of the changed value of the second context item;

wherein the second module is associated with the second context item, the second functional module to execute second functionality based on the changed value of the second context item;

the processor to further provide:

a third functional module associated with the second context item, the third functional module to execute third functionality based on the changed value of the second context item;

wherein the third functional module is further to receive third user input, to change a value of a third context item in response to the third user input and to execute fourth functionality based on the changed value of the third context item;

wherein the first context item and the third context item each describe a same environment variable;

wherein the second functional module does not execute the first functionality based on the changed value of the third context item;

wherein the third functional module does not execute the fourth functionality based on the changed value of the first context item;

wherein the environmental variable that is described by both the first context item and the third context item has a name;

wherein the second functional module generates a visualization that displays: (i) the changed value of the first context item and (ii) the name of the environmental variable that is described by both the first context item and the third context item;

wherein the third functional module generates a visualization that displays: (a) the changed value of the third context item and (b) the name of the environmental variable that is described by both the first context item and the third context item; and wherein the visualization that is generated by the second functional module and displays: (i) the changed value of the first context item and (ii) the name of the environmental variable is displayed in a same view as the visualization that is generated by the third functional module and displays: (a) the changed value of the third context item and (b) the name of the environmental variable.

2. A system according to claim 1, wherein the first functional module is to execute fifth functionality based on the changed value of the first context item.

3. A system according to claim 1, the processor to further provide:

a fourth functional module to receive fourth user input and to issue a third instruction to change the value of the first context item in response to the fourth user input, wherein the context services provider is further to receive the third instruction and to issue a third notification of the changed value of the first context item, and wherein the second functional module is further to receive the third notification based on the association with the first context item, and to execute fifth functionality based on the third notification of the changed value of the first context item.

4. A system according to claim 1, wherein the second functional module is further to receive fourth user input and to issue a third instruction to change the value of the first context item in response to the fourth user input, and wherein the context services provider is further to receive the third instruction and to issue a third notification of the changed value of the first context item.

5. A system according to claim 1, wherein the second functional module is to receive the second user input and to issue the second instruction to change the value of a second context item in response to the second user input, and wherein the first functional module is associated with the second context item, and is further to receive the notification based on the association with the second context item, and to execute functionality based on the notification received by the first functional module.

6. A system according to claim 1, wherein the first context service provider comprises a context service provider selected, by a designer during design time; and wherein the first context item comprises a first context item selected, by the designer during design time, from a set of context items associated with the selected context service provider.

7. A system according to claim 1, wherein the second functional module uses the changed value of the first context item and a previous value of the first context item in generating a single visualization;

the processor to further provide:

a fourth functional module to execute fifth functionality based on the changed value of the first context item;

wherein the fourth functional module uses the changed value of the first context item but does not use a previous value of the first context item in generating a single visualization that is displayed in a same view as the single visualization generated by the second functional module.

8. A non-transitory medium storing processor-executable program code, the program code comprising:

program code to provide a first functional module to receive user input and to issue an instruction to change a value of a first context item in response to the user input;

program code to provide a context services provider to receive the instruction and to issue a notification of the changed value of the first context item; and program code to provide a second functional module associated with the first context item, the second functional module to receive the notification based on the association with the first context item, and to execute first functionality based on the notification of the changed value of the first context item;

wherein the first functional module or the second functional module is further to receive second user input and to issue a second instruction to change the value of a second context item in response to the second user input, and wherein the context services provider is further to receive the second instruction and to issue a second notification of the changed value of the second context item, wherein the second module is associated with the second context item, the second functional module to execute second functionality based on the changed value of the second context item;

the program code further comprising:

program code to provide a third functional module associated with the second context item, the third functional module to execute third functionality based on the changed value of the second context item;

wherein the third functional module is further to receive third user input, to change a value of a third context item in response to the third user input and to execute fourth functionality based on the changed value of the third context item;

wherein the first context item and the third context item describe a same environment variable;

wherein the second functional module does not execute the first functionality based on the changed value of the third context item;

wherein the third functional module does not execute the fourth functionality based on the changed value of the first context item;

wherein the environmental variable that is described by both the first context item and the third context item has a name;

wherein the second functional module generates a visualization that displays: (i) the changed value of the first context item and (ii) the name of the environmental variable that is described by both the first context item and the third context item;

wherein the third functional module generates a visualization that displays: (a) the changed value of the third context item and (b) the name of the environmental variable that is described by both the first context item and the third context item; and wherein the visualization that is generated by the second functional module and displays: (i) the changed value of the first context item and (ii) the name of the environmental variable is displayed in a same view as the visualization that is generated by the third functional module and displays: (a) the changed value of the third context item and (b) the name of the environmental variable.

9. A medium according to claim 8, wherein the first functional module is to execute fifth functionality based on the changed value of the first context item.

10. A medium according to claim 8, the program code further comprising:

program code to provide a fourth functional module to receive fourth user input and to issue a third instruction to change the value of the first context item in response to the fourth user input, wherein the context services provider is further to receive the third instruction and to issue a third notification of the changed value of the first context item, and wherein the second functional module is further to receive the third notification based on the association with the first context item, and to execute fifth functionality based on the third notification of the changed value of the first context item.

11. A medium according to claim 8, wherein the second functional module is further to receive fourth user input and to issue a third instruction to change the value of the first context item in response to the fourth user input, and wherein the context services provider is further to receive the third instruction and to issue a third notification of the changed value of the first context item.

12. A medium according to claim 8, wherein the second functional module is further to receive the second user input and to issue the second instruction to change the value of a second context item in response to the second user input, and wherein the first functional module is associated with the second context item, and is to receive the notification based on the association with the second context item, and to execute functionality based on the notification received by the first functional module.

13. A medium according to claim 8, wherein the first context service provider comprises a context service provider selected, by a designer during design time; and wherein the first context item comprises a first context item selected, by the designer during design time, from a set of context items associated with the selected context service provider.

14. A medium according to claim 8, wherein the second functional module uses the changed value of the first context item and a previous value of the first context item in generating a single visualization;

the program further comprising:

program code to provide a fourth functional module to execute fifth functionality based on the changed value of the first context item;

wherein the fourth functional module uses the changed value of the first context item but does not use a previous value of the first context item in generating a single visualization that is displayed in a same view as the single visualization generated by the second functional module.

15. A method comprising:

receiving user input at a first functional module provided by a processor;

issuing an instruction from the first functional module to change a value of a first context item in response to the user input;

receiving the instruction at a context services provider provided by the processor;

issuing, via the context services provider, a notification of the changed value of the first context item; and receiving the notification at a second functional module, provided by the processor, based on an association of the second functional module with the first context item; and execute first functionality of the second functional module based on the notification of the changed value of the first context item;

receiving second user input at the first functional module or the second functional module;

issuing a second instruction from the first functional module or the second functional module to change the value of a second context item in response to the second user input;

receiving the second instruction at the context services provider;

issuing, via the context services provider, a second notification of the changed value of the second context item;

execute second functionality of the second functional module based on the changed value of the second context item;

executing third functionality of a third functional module, provided by the processor, based on the changed value of the second context item;

receiving third user input at the third functional module;

changing the value of a third context item in response to the third user input; and executing fourth functionality of the third functional module based on the changed value of the third context item;

wherein the first context item and the third context item describe a same environment variable;

wherein the first functionality of the second functional module is not executed based on the changed value of the third context item;

wherein the fourth functionality of the third functional module is not executed based on the changed value of the first context item;

wherein the environmental variable that is described by both the first context item and the third context item has a name;

wherein the second functional module generates a visualization that displays: (i) the changed value of the first context item and (ii) the name of the environmental variable that is described by both the first context item and the third context item;

wherein the third functional module generates a visualization that displays: (a) the changed value of the third context item and (b) the name of the environmental variable that is described by both the first context item and the third context item; and wherein the visualization that is generated by the second functional module and displays: (i) the changed value of the first context item and (ii) the name of the environmental variable is displayed in a same view as the visualization that is generated by the third functional module and displays: (a) the changed value of the third context item and (b) the name of the environmental variable.

16. A method according to claim 15, further comprising:

executing fifth functionality of the first functional module based on the changed value of the first context item.

17. A method according to claim 15, further comprising:

receiving fourth user input at a fourth functional module provided by the processor;

issuing a third instruction from the fourth functional module to change the value of the first context item in response to the fourth user input;

receiving the third instruction at the context services provider;

issuing, via the context services provider, a third notification of the changed value of the first context item;

receiving the third notification at the second functional module based on the association of the second functional module with the first context item; and executing fifth functionality of the second functional module based on the third notification of the changed value of the first context item.

18. A method according to claim 15, further comprising:

receiving fourth user input at the second functional module;

issuing a third instruction from the second functional module to change the value of the first context item in response to the fourth user input, and receiving the third instruction at the context services provider;

issuing, via the context services provider, a third notification of the changed value of the first context item.

19. A method according to claim 15, further comprising:

receiving the second user input at the second functional module;

issuing the second instruction from the second functional module to change the value of the second context item in response to the second user input;

receiving notification at the first functional module based on an association of the first functional module with the second context item; and executing functionality of the first functional module based on the notification received by the first functional module.

20. A method according to claim 15, wherein the first context service provider comprises a context service provider selected, by a designer during design time; and wherein the first context item comprises a first context item selected, by the designer during design time, from a set of context items associated with the selected context service provider.

21. A method according to claim 15, wherein the second functional module uses the changed value of the first context item and a previous value of the first context item in generating a single visualization;

the method further comprising:

executing fifth functionality of a fourth functional module, provided by the processor, based on the changed value of the first context item;

wherein the fourth functional module uses the changed value of the first context item but does not use a previous value of the first context item in generating a single visualization that is displayed in a same view as the single visualization generated by the second functional module.

22. A non-transitory medium storing processor-executable program code, the program code comprising:

program code to provide a first functional module to receive user input and to issue an instruction to change a value of a first context item in response to the user input;

program code to provide a context services provider to receive the instruction and to issue a notification of the changed value of the first context item; and program code to provide a second functional module associated with the first context item, the second functional module to receive the notification based on the association with the first context item, and to execute first functionality based on the notification of the changed value of the first context item;

wherein the first functional module or the second functional module is further to receive second user input and to issue a second instruction to change the value of a second context item in response to the second user input, and wherein the context services provider is further to receive the second instruction and to issue a second notification of the changed value of the second context item, wherein the second module is associated with the second context item, the second functional module to execute second functionality based on the changed value of the second context item;

the program code further comprising:

program code to provide a third functional module associated with the second context item, the third functional module to execute third functionality based on the changed value of the second context item;

wherein the third functional module is further to receive third user input, to change a value of a third context item in response to the third user input and to execute fourth functionality based on the changed value of the third context item;

wherein the first context item and the third context item describe a same environment variable;

wherein the second functional module does not execute the first functionality based on the changed value of the third context item;

wherein the third functional module does not execute the fourth functionality based on the changed value of the first context item; and wherein the second functional module uses the changed value of the first context item and a previous value of the first context item in generating a single visualization;

the program further comprising:

program code to provide a fourth functional module to execute fifth functionality based on the changed value of the first context item;

wherein the fourth functional module uses the changed value of the first context item but does not use a previous value of the first context item in generating a single visualization that is displayed in a same view as the single visualization generated by the second functional module.

* * * * *